United States Patent Office 2,830,358
Patented Apr. 15, 1958

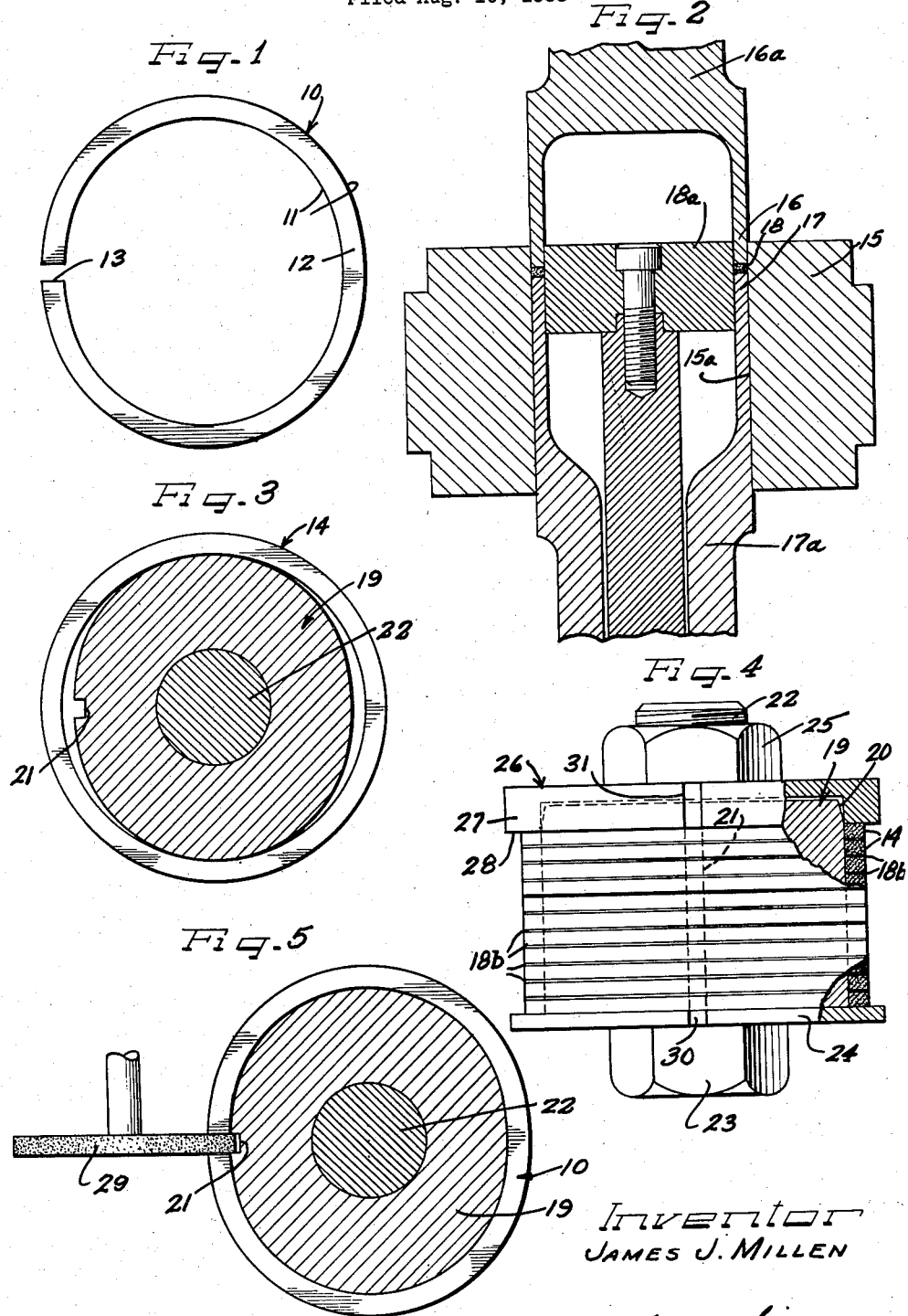

2,830,358

METHOD OF MAKING PISTON RINGS

James J. Millen, East Cleveland, Ohio, assignor to Thompson Products, Inc., Cleveland, Ohio, a corporation of Ohio Application August 10, 1955, Serial No. 527,580

2 Claims. (Cl. 29—156.62)

The present invention relates to a new and improved method for making piston rings from powdered metals, and particularly relates to a method for shaping and heat treating powdered metal piston rings for internal combustion engines so as to develop a "free gap" piston ring shape without twisting or other warpage during such treatment.

Powdered metal internal combustion engine piston rings sintered from ring blanks or compacts have very desirable properties. However, distortion and warpage which occur in sintering the powdered metal ring compacts has necessitated such expensive machining and finishing operations that such rings have not been adopted on a large scale.

The present invention now provides a method of making powdered metal piston rings wherein the distortion or warpage of the ring compacts during the operation of sintering is actually utilized to produce the desired "free gap" ring shape. As a result of this method, the sintered rings need only very inexpensive grinding and turning operations to yield the finished product.

The "free gap" shape of a piston ring as used herein, is defined as that elliptical or non-circular shape of the ring in its unrestrained state so designed as to give the desired radial pressure pattern after installation in an internal combustion engine.

According to this invention, powdered metal compositions of high shrinkage characteristics are die-pressed to the form ring compacts. The rings thus molded are stacked, desirably with suitable intervening sheets of thin paper to prevent adjacent rings from sticking together, on a warp-resisting mandrel having an elliptical shape desired for the "free gap" shape of the piston ring. The stack is axially loaded to hold the rings flat. The loaded assembly is then sintered in a non-oxidizing atmosphere, whereupon the rings assume the shape of the mandrel. The assembly may be heat treated after sintering to relieve stresses and develop desired properties. The rings thus shaped to conform to the mandrel are then slotted while they are still on the mandrel. After the slots are cut, the rings are stripped from the mandrel, side ground to desired thickness, and lathe turned to finished O. D. size. Thus, by heat treating a plurality of powdered metal ring compacts stacked in clamped relation on a mandrel having a predetermined free gap shape, the desired free gap shape is imparted to the rings while preventing twist and warpage thereof, and while simultaneously relieving tensions and strains.

In according with the foregoing, then, it is an object of this invention to provide a method of making powdered metal piston rings which controls and uses the shrinkage of the metal during a sintering operation to develop a desired "free gap" shape for the ring.

Another object of the invention is to provide a method of making powdered metal piston rings wherein warpage or distortion during heat treating is controlled and used to eliminate subsequent expensive finishing steps.

A further object is to provide a method of making powdered metal piston rings wherein no expensive coining or machining operations are necessary.

Other objects and advantages of the instant invention will be apparent to those skilled in the art from the following descriptions of the annexed sheet of drawings which illustrates a preferred embodiment of the invention.

On the drawings:

Figure 1 is a plan view of a piston ring produced in accordance with the method of the instant invention.

Figure 2 is a transverse sectional view of a molding die showing the step of forming a piston ring compact from powdered metal in accordance with this invention.

Figure 3 is a plan view of a circular piston ring compact produced as shown in Figure 2 mounted on an elliptical shaped mandrel shown in cross-section.

Figure 4 is a side elevational view with parts broken away of a mandrel having a plurality of piston ring compacts stacked thereon and clamped against axial movement.

Figure 5 is a view similar to Figure 3 but showing the shape of the ring after sintering and also illustrating somewhat diagrammatically the manner in which the slot or gap is cut in the ring.

As shown on the drawings:

As shown in Figure 1, the piston ring 10 produced according to this invention has inner and outer peripheries 11 of a desired non-circular free gap contour, together with flat side faces, such as 12, and a contraction and expansion slot or gap 13 preferably formed thereacross. The ring, as shown, is in a free uncontracted oval or elliptical shape which is exaggerated for purposes of illustration of the features of this invention. When placed on a piston in an engine cylinder, the ring will be contracted, by diminishment of the gap 13, to a substantially circular shape exerting sealing pressure against the cylinder wall.

In accordance with this invention, the ring 10 is produced from powdered metal by initially forming a circular compact 14 illustrated in Figures 2 and 3. As shown in Figure 2, the compact 14 is prepared in a high-pressure molding die including an outer die block 15 having a cylindrical opening 15a extending therethrough. Annular flanges 16—17 are carried in axially opposed relationship by upper and lower punches 16a and 17a, and those punches 16a and 17a are caused by mechanism (not shown) to reciprocate axially of opening 15a. The flanges 16—17 thereby provide between their end faces an annular compaction chamber 18 in which the powdered metal is compacted. A die core 18a provides the inner die member, and that core 18a is carried and supported by a shaft which extends through a hollow stem of the lower punch 16a.

In forming the compact 14, powdered metal composition is placed in the compaction chamber 18, and the punches 16a—17a are forced together to develop a suitable compressive molding pressure on the powdered metal in the chamber 18. Pressures of and from 35 to 50 tons per square inch are suitable. A self-supporting compact 14 is thereby formed and can be removed after the punches 16a—17a are moved upwardly relatively to die 15 and core 18a a distance sufficient for the compact 14 to clear the die and core.

The powdered metal composition for producing the compact 14 can vary throughout a relatively wide range depending upon the type of piston ring that is to be produced. The composition, however, should have a relatively high shrinkage characteristic to convert the circular ring compact 14 into the non-circular free gap shape desired for the finished ring. In producing piston rings for internal combustion engines, the composition should be chosen so as to yield a high strength ring capable of resisting the heat and corrosion conditions encountered in internal combustion engine operation. A desired composition is as follows:

Chemical analysis

| | Max. |
|---|---|
| C | 0.05 |
| Mn | .60 |
| P | .02 |
| S | .02 |
| Si | .15 |
| Pb | .10 |
| Sn | .10 |
| Zn | .10 |
| Other elements | .30 |
| Fe | Bal. |

A composition such as the above has a spongy particle appearance and should preferably have a particle size varying from 100 mesh to −325 mesh. A typical example of the mesh size of a suitable alloy is as follows:

Screen analysis

| Sieve No.: | Percent retained |
|---|---|
| 100 mesh | 0.0 to 0.1 |
| 150 mesh | 5.0 to 18.0 |
| 200 mesh | 16.0 to 24.0 |
| 250 mesh | 5.0 to 11.0 |
| 325 mesh | 16.0 to 29.0 |
| −325 mesh | 36.0 to 42.0 |

It is desirable to admix a minor portion of graphite or similar material with the metal powder prior to forming the compact. The graphite is particularly desirable as it acts as a lubricant during the pressure step and inhibits decarburization during the sintering step. Traces of the graphite which are left in the finished product act as a lubricant for the finished ring when operating in an internal combustion engine. The quality, percentage, and mesh size of the graphite can vary widely but it is preferred to use from about 1 to 4% graphite by weight of the powdered alloy-graphite mixture. The graphite preferably is produced by the electric furnace method and contains about 99.5% carbon and has a particle size of about 200 mesh.

About one-half percent of zinc stearate is desirably added to serve as a die lubricant.

If desired, the composition can also contain infiltrant metals such as copper in minor amounts, up to 10% by weight. Copper apparently improves density of the finished product by providing a liquid phase during the subsequent sintering step. Its presence adds strength to the finished product.

The compacts 14 are placed on a mandrel 19 in stacked relation, and desirably adjacent compacts 14 are separated by intervening sheets of paper 18b to prevent the compacts from sticking together.

The mandrel is composed of a material which will resist warping at high temperatures, yet it should have a coefficient of expansion equal to or greater than the powder metal material in order to eliminate the possibility of the rings being stressed by shrinking while on the mandrel during subsequent cooling. Temperature resisting metals such as "Inconel," "Stellite," and the like, are useful.

As shown in Figure 3, the mandrel 19 is oval or elliptical in shape. This shape is designed to reproduce the desired free gap piston ring shape. The circular ring compacts 14 initially only engage the mandrel 19 at diametrically opposed areas but they have a snug fit on the mandrel at these areas. If desired, the rings can be hydraulically pressed onto the mandrel, and the mandrel can have a tapered nose or end section 20 for facilitating feeding of the rings to the main body of the mandrel. The unsintered compacts 14 have sufficient plasticity to accommodate the forcing onto the mandrel.

As shown in Figure 4, the mandrel has a groove or slot 21 in the periphery thereof adapted to receive a slot-cutting tool as will be hereinafter formally described. As shown in Figure 3, this groove 21 is in a minor axis face portion of the oval mandrel.

The stack of ring compacts 14 on the mandrel 19 is clamped by means of any suitable clamping device capable of exerting axial pressure on the stack to maintain the sides 12 of the compact in fairly tight face-to-face engagement. The illustrated clamping device includes a bolt 22 extending through a central hole in the mandrel and having a head 23 on one end bottoming a washer 24 which underlies the bottom ring compact 14 of the stack. The threaded end of the bolt 22 receives a nut 25 which forces a recessed or cup-shaped washer 26 against the top compact 14. The washer 26 has a depending flange or side wall 27 fitting around the top of the mandrel to present a flat bottom wall 28 against the top face of the top compact 14. Care should be taken to avoid excessive tightening of the clamp means employed, for the unsintered compacts 14 have a fairly low strength. In order to compensate for shrinkage of the stack during sintering the washer 26 can be quite heavy and positioned uppermost in the sintering furnace to have a dead weight load on the stack. Also a heat resisting spring could be interposed between the nut 25 and washer 26 to act as a take up means for maintaining a load on the stack.

The stack of compacts 14 on the mandrel is subjected to a sintering operation for bonding and setting the individual metal particles to produce the piston rings 10 of this invention. The mandrel and the stack of compacts thereon is preferably carried in a sintering furnace on carbon boats to inhibit decarburization. Preferred temperatures extend from 1800° to 2100° F., and the actual time and the temperature employed will vary in accordance with the nature of the powdered mass.

In the sintering furnace, it is necessary to provide a protective atmosphere to prevent decarburization of the compact. For the sake of economy, a protective atmosphere composed of burned gases such as partially or completely cracked hydrocarbons is useful. The ratio of carbon monoxide to carbon dioxide in a protective atmosphere should be enough to retain about 3% carbon in the finished ring with about 1.5% as graphitic carbon. The dewpoint must be kept low, at approximately −50° F., and carbon dioxide minimized.

After the piston ring compacts have been sintered, they are allowed to cool at the end of the sintering furnace or in a similar environment. If desired, the rings may be quenched in oil or water from about 1600° to 1700° to strengthen the finished rings. If the quench is used, the assembly is heat treated to relieve tension and stress. A suitable heat treating step for eliminating stresses and strains in the rings will include heat treatment on the mandrel at from 800° to 1200° F. for about one-half to one and one-half hours followed by air cooling.

As illustrated in Figure 5, the sintering and heat treatment on the mandrel 19 causes the compact 14 to assume the free gap shape of the ring 10, and the ring 10 hugs the entire periphery of the mandrel 19.

It will be appreciated, of course, that the elliptical or oval shape of the mandrel is also somewhat exaggerated.

As also illustrated in Figure 5, a gapping tool such as a circular saw 29 guided by the indexing slot 21 in the mandrel and by mating slots 30 and 31 in the washers 24 and 26 (Figure 4), cuts the gap or slot 13 in each ring 10. The exact width of the gap will be determined by Young's modulus of the material from which the ring is made, the bore diameter, the axial thickness, the radial width, and the like properties. These properties will vary depending upon the engine in which the ring is to be employed.

After the gapping or slugging operation has been accomplished by the saw 29, the clamping device is removed and the stack of rings is removed from the mandrel. It is then only necessary to give the resulting rings 10 to a simple finishing operation by side grinding the faces 12 and by turning the outer peripheral surface to the diameter.

From the above descriptions, it will, therefore, be understood that this invention now provides a simple, inexpensive method of making powdered metal piston rings.

It will be understood that variations and modifications may be effected without departing from the scope of the novel concepts of this invention.

I claim as my invention:

1. The method of making piston rings which comprises die-molding a blend of powdered iron with from 1 to 4% by weight of graphite to form continuous rings of substantially circular shape, mounting a plurality of said rings in a stack on a non-circular mandrel, axially loading the stack on the mandrel, sintering the assembly in a protective atmosphere at temperatures from about 1800° to 2100° F. for about from 45 to 60 minutes, cooling the resulting sintered assembly on the mandrel to room temperature, and severing the rings in the stack to provide a suitable expansion and contraction gap in each ring.

2. The method of making piston rings of desired free gap oval shape which comprises pressure molding continuous circular rings from powdered metal, mounting the rings on an oval mandrel, sintering the thus mounted rings while simultaneously shrinking the rings into conformity with the mandrel, and gapping the rings on the mandrel to provide expansion and contraction slots therethrough.

References Cited in the file of this patent

FOREIGN PATENTS

| | | |
|---|---|---|
| 551,231 | Great Britain | Feb. 12, 1943 |
| 552,532 | Great Britain | Apr. 13, 1943 |
| 556,385 | Great Britain | Dec. 28, 1944 |